| ENGINE CYLINDERS | FUEL IGNITORS | FUEL INJECTORS | ENGINE OPERATING CYCLE | |
|---|---|---|---|---|
| | | | FIRST STAGE | SECOND STAGE |
| FIRST BANK 1-5-3 | FIRST GROUP | | IGNITE | |
| | | FIRST GROUP | | INJECT |
| SECOND BANK 6-2-4 | SECOND GROUP | | | IGNITE |
| | | SECOND GROUP | INJECT | |
*Fig. 2*
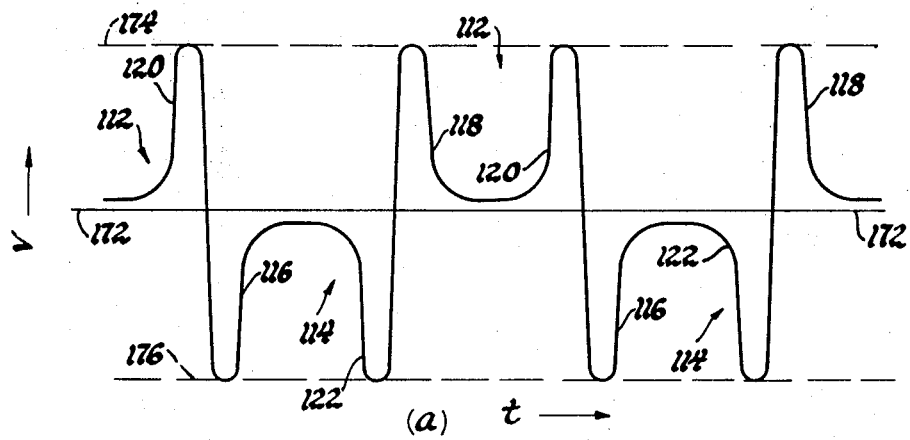
(a)
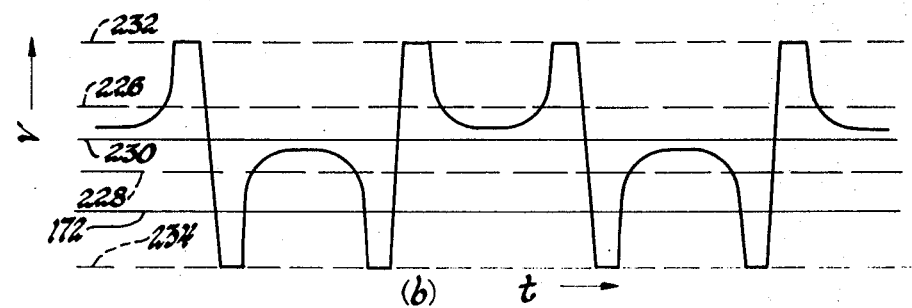
(b)
(c)
*Fig. 3*
INVENTORS.
Gerald O. Huntzinger &
BY Donald O. Ruff
Jim S. Jagodzinski
ATTORNEY

United States Patent Office 3,606,869
Patented Sept. 21, 1971

3,606,869
APPARATUS FOR ELECTRICALLY SYNCHRONIZ-
ING FUEL INJECTION WITH FUEL IGNITION
IN AN INTERNAL COMBUSTION ENGINE
Gerald O. Huntzinger and Donald O. Ruff, Anderson,
Ind., assignors to General Motors Corporation, Detroit,
Mich.
Filed May 11, 1970, Ser. No. 36,055
Int. Cl. F02m 51/00
U.S. Cl. 123—32EA        8 Claims

ABSTRACT OF THE DISCLOSURE

In an internal combustion engine having a plurality of cylinders arranged in first and second banks, an electronic fuel injection system includes a timing apparatus for synchronizing the injection order of the cylinders with the ignition order of the cylinders. The timing apparatus comprises a timing transducer and a timing circuit. The timing transducer includes a pair of rotatable permanent magnets oppositely poled with respect to a stationary winding for producing alternate first and second timing pulse pairs in synchronization with the operating cycles of the engine. The first and second timing pulse pairs exhibit opposite polarity transitions effectively dividing each engine operating cycle into first and second operating stages. The timing circuit includes a bistable multivibrator for producing a timing signal which alternately shifts between first and second levels in response to the opposite polarity transitions in the first and second timing pulse pairs. In a conventional manner, a fuel ignition system sequentially fires the first bank of cylinders during the first operating stage and sequentially fires the second bank of cylinders during the second operating stage. In a complementary manner, the fuel injection system is responsive to the first and second levels of the timing signal to simultaneously charge the first bank of cylinders during the first operating stage and to simultaneously charge the second bank of cylinders during the second operating stage. Thus, the injection order of the cylinders is time division synchronized with the ignition order of the cylinders.

---

The present invention relates to an electronic fuel injection system for an internal combustion engine. More particularly, the invention realtes to a timing apparatus for electrically synchronizing the operation of a fuel injection system with the operation of a fuel ignition system in an internal combustion engine.

Generally, fuel injection systems for internal combustion engines may be classified within two broad categories; namely, direct or "cylinder" injection systems, and indirect or "port" injection systems. In cylinder injection systems, fuel is directly supplied to the engine by injecting it into the combustion chambers or cylinders of the engine. In port injection systems, fuel is indirectly supplied to the engine by injecting it into the induction passage or intake manifold of the engine.

With port injection systems, it is customary to divide the cylinders of the engine into first and second banks. The fuel injection system, which includes a plurality of fuel injectors, alternately applies fuel to the first bank of cylinders simultaneously and to the second bank of cylinders simultaneously. Conventionally, the ignition order of the cylinders is determined by a fuel ignition system, which includes a plurality of fuel ignitors. Therefore, since fuel injection must precede fuel ignition, it is necessary that the operation of the fuel injection system be properly synchronized with the operation of the fuel ignition system.

Typically, the energization of the fuel ignitors in the fuel ignition system is electrically synchronized with the operating cycles of the engine by a conventional rotary switch distributor which determines the ignition order of the cylinders. The present invention provides a timing apparatus for electrically synchronizing the energization of the fuel injectors in the fuel injection system with the operating cycles of the engine to determine the injection order of the cylinders. Further, the fuel ignitors and the fuel injectors are alternately energized according to a complementary time division schedule so that the injection order defined by the fuel injection system is always synchronized with the ignition order defined by the fuel ignition system.

According to one aspect of the invention, each engine operating cycle is separated into first and second operating stages. In addition, the fuel injectors of the fuel injection system are divided into first and second simultaneously energized groups. Similarly, the fuel ignitors of the fuel ignition system are divided into first and second sequentially energized groups. During the first operating stage, the first group of fuel ignitors fires the first bank of cylinders while the second group of fuel injectors charges the second bank of cylinders. Conversely, during the second operating stage, the second group of fuel ignitors fires the second bank of cylinders while the first group of fuel injectors charges the first bank of cylinders. This feature insures that the injection order of the cylinders is always time division synchronized with the ignition order of the cylinders.

In another aspect of the invention, the onset of the first operating stage is marked by the initiation of a first timing pulse having a first polarity. Similarly, the onset of the second operating stage is marked by the initiation of a second timing pulse having a second polarity. A bilevel timing signal is shifted to a first level in response to the first polarity of the first timing pulse and is shifted to a second level in response to the second polarity of the second timing pulse. The first group of fuel injectors is energized when the timing signal is at the second level and the second group of fuel injectors is energized when the timing signal is at the first level. This feature makes certain that the operation of the fuel injectors is always synchronized with the engine regardless of which of the first and second operating stages the engine resides in upon initial startup.

As contemplated by a further aspect of the invention, first and second timing pulse pairs are produced in synchronization with the occurrence of the engine operating cycles. The first timing pulse pair includes the first timing pulse having the first polarity and another pulse having the second polarity. The second timing pulse pair includes the second timing pulse having the second polarity and another pulse having the first polarity. The first timing pulse pair exhibits a second-to-first polarity transition occurring in time between the firing of the last fired cylinder in the second bank and the first cylinder in the first bank. The second timing pulse pair exhibits a first-to-second polarity transition occurring in time between the firing of the last fired cylinder in the first bank and the first fired cylinder in the second bank. The timing signal undergoes a second-to-first level transition when the first timing pulse pair experiences the second-to-first polarity transition. Further, the timing signal undergoes a first-to-second level transition when the second timing pulse pair experiences a first-to-second polarity transition. The first group of fuel injectors is energized in response to a first-to-second level transition in the timing signal and the second group of fuel injectors is energized in response to a second-to-first level transition in the timing signal. This feature guarantees that the operation of the fuel injectors is always synchronized with the operating cycles of the engine regardless of the operating frequency or speed of the engine.

According to yet another aspect of the invention, the first and second timing pulse pairs are developed by a timing transducer having a minimum of critical dimensions and a minimum of contacting parts. The timing transducer includes a stator having a winding and a rotor having a pair of permanent magnets oppositely poled with respect to the winding. The rotor is driven relative to the stator in synchronization with the occurrence of the first and second operating stages of each engine operating cycle or, in other words, in synchronization with the ignition order of the cylinders. Accordingly, the permanent magnets are alternately rotated into and out of electromagnetic coupling relationship with the winding to produce the first and second timing pulse pairs containing the first and second timing pulses.

In yet a further aspect of the invention, the timing signal is produced by a timing circuit operable over a broad engine speed range. The timing circuit includes a bistable multivibrator or flip-flop having first and second transistors which are oppositely switchable between first and second conductive conditions in response to the first and second timing pulse pairs to produce the first and second levels of the timing signal. The timing circuit further includes an RC filter for attenuating spurious noise signals induced within the winding of the timing transducer to prevent false switching of the multivibrator. The timing circuit also includes a clipper for limiting the magnitude of the first and second timing pulse pairs so as to protect the multivibrator at relatively high engine speeds.

These and other aspects and advantages of the invention may be best understood by reference to the following detailed description of a preferred embodiment when considered in conjunction with the drawing, in which:

FIG. 2 is a table illustrating several relationships useful in explaining the principles of the invention.

FIG. 3 is a graph illustrating several waveforms useful in explaining the principles of the invention.

Figure 1:
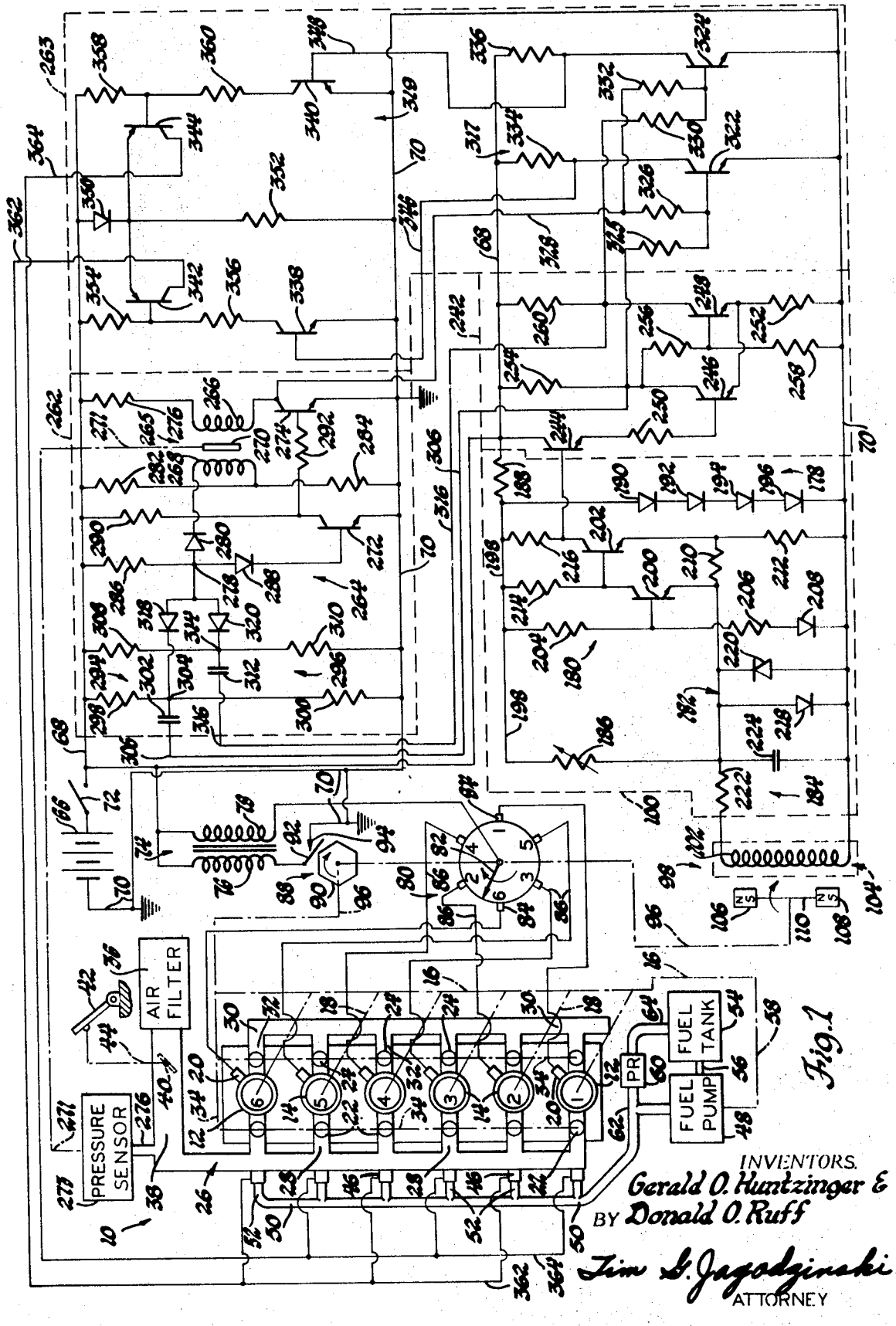
FIG. 1 is a schematic diagram of an electronic fuel injection system incorporating the principles of the invention.

Referring to FIG. 1, a conventional internal combustion engine 10 for an automotive vehicle includes a plurality of combustion chambers or cylinders 12 which are numbered 1-6. Although six cylinders 12 are shown, it will be understood that the engine 10 may have more or less than six cylinders 12 as desired. A plurality of pistons 14 are each reciprocally driven within a different associated one of the cylinders 12 in response to the occurrence of combustion within the cylinders 12. An output shaft or crankshaft 16 is rotatably driven by the pistons 14 through a plurality of connecting rods 18. A plurality of fuel ignitors or spark plugs 20 each cooperate with a different associated one of the cylinders 12 for initiating combustion within the cylinders 12.

A plurality of intake valves 22 each cooperate with a different associated one of the cylinders 12 for regulating the entry of the combustion ingredients or the air/fuel mixture into the cylinders 12 before combustion to charge the cylinders 12. A plurality of exhaust valves 24 each cooperate with a different associated one of the cylinders 12 for regulating the exit of the combustion products or exhaust gases from the cylinders 12 after combustion to discharge the cylinders 12. An induction passage or intake manifold 26 communicates with each of the intake valves 22 through a series of inlet ducts 28 for transmitting the air/fuel mixture to the intake valves 22. An expulsion passage or exhaust manifold 30 communicates with each of the exhaust valves 24 through a series of outlet ducts 32 for receiving the exhaust gases from the exhaust valves 24. Conventionally, the exhaust manifold is connected with an exhaust system including a muffler and a tail pipe. The intake valves 22 and the exhaust valves 24 are slidably driven by the crankshaft 16 through a suitable linkage 34 which normally includes a camshaft, a plurality of rocker arms and a plurality of valve lifters.

Air and fuel are combined within the intake manifold 26 to form the air/fuel mixture. An air filter 36 is disposed across an entrance channel 38 in the intake manifold 26. Air is drawn into the intake manifold 26 through the air filter 36 and the entrance channel 38. A throttle 40 is pivotally mounted in the entrance channel 38 for regulating the amount of air drawn into the intake manifold 26 in response to the position of a control element provided by the vehicle accelerator pedal 42 which is connected with the throttle 40 through a suitable linkage 44. A plurality of fuel injectors 46 are each mounted on the intake manifold 26 in cooperation with a different associated one of the cylinders 12 through the inlet ducts 28 and the intake valves 22. Fuel is injected into the intake manifold 26 at a constant flow rate when the fuel injectors 46 are energized. The fuel is deposited into the intake manifold 26 in individual atomized loads generally located within the inlet ducts 28 adjacent the intake valves 22 of the cylinders 12. The amount of fuel constituting each of the atomized fuel loads is determined by the time period during which the fuel injectors 46 are energized by an electronic control section of the illustrated fuel injection system which will be more fully described later.

Conventionally, the fuel injectors 46 may each be provided by a valve having a plunger which is driven to a fully open position against a spring bias to apply fuel when a solenoid is energized and which is driven to a fully closed position by the spring bias when the solenoid is deenergized. However, it will be appreciated that the fuel injectors 46 may each be provided by virtually any constant flow rate valve. Further, although six fuel injectors 46 are shown, it is to be noted that the fuel injectors 46 may be more or less in number than the number of cylinders 12.

A fuel pump 48 is connected with each of the fuel injectors 46 through a conduit 50 having a plurality of branch pipes 52. In addition, the fuel pump 48 is connected to a fuel reservoir provided by the vehicle fuel tank 54 through a conduit 56. The fuel pump 48 supplies fuel from the fuel tank 54 to the fuel injectors 46. Preferably, the fuel pump 48 is mechanically driven from the crankshaft 16 through a suitable linkage 58. Alternately, the fuel pump 48 may be electrically driven. A pressure regulator 60 is connected to the conduit 50 through a conduit 62 and is connected to the fuel tank 54 through a conduit 64 for regulating the pressure of the fuel supplied to the fuel injectors 46. Thus, the fuel injectors 46 combine with the fuel pump 48, the fuel tank 54 and the pressure regulator 60 to form a fuel supply section of the illustrated fuel injection system.

An electrical power supply provided by the vehicle battery 66 applies a supply voltage between a power line 68 and a ground line 70 through a control switch provided by the vehicle ignition switch 72. A conventional ignition coil 74 includes a low voltage winding 76 and a high voltage winding 78 which are inductively coupled in the usual manner. A conventional distributor 80 includes a distributor arm 82 cooperating with a plurality of distributor contacts 84 which are numbered 1-6. A plurality of distributor cables 86 connect the individually numbered distributor contacts 84 with the fuel ignitors 20 associated with the correspondingly numbered cylinders 12. A conventional breaker arrangement 88 includes a breaker cam 90 having six lobes cooperating with a breaker arm 92 and a breaker contact 94. The high voltage winding 78 of the ignition coil 74 is connected between the power line 68 and the distributor arm 82. The low voltage winding 76 of the ignition coil 74 is connected between the power line 68 and the breaker arm 92. The breaker contact 94 is connected directly to the ground line 70. The distributor arm 82 and the breaker cam 90 are rotatably driven, as indicated by the arrows, from the crankshaft 16 through a distributor shaft 96 which makes a single revolution during each operating cycle of the engine 10.

As the breaker cam 90 is rotated by the distributor shaft 96, it repeatedly moves the breaker arm 92 into and out of engagement with the breaker contact 94 six times during each revolution of the breaker cam 90 to develop a series of low voltage ignition pulses in the low voltage winding 76. The low voltage ignition pulses in the low voltage winding 76 are transformed into high voltage ignition pulses in the high voltage winding 78 which applies the high voltage ignition pulses to the distributor arm 82. As the distributor arm 82 is rotated by the distributor shaft 96, it successively engages each of the distributor contacts 84 once during each revolution of the distributor arm 82 to apply the high voltage ignition pulses to energize the fuel ignitors 20 through the respective distributor cables 86. The fuel ignitors 20 each generate an ignition spark when energized in response to the application of a high voltage ignition pulse. The ignition spark fires the associated one of the cylinders 12 by igniting the air/fuel mixture to initiate combustion. Thus, the fuel ignitors 20 combine with the ignition coil 74, the distributor 80 and the breaker arrangement 88 to form a fuel ignition system for the engine 10.

It will now be apparent that for any given one of the cylinders 12, the associated one of the fuel injectors 46 must be energized to apply a fuel load to the cylinder before the associated one of the fuel ignitors 20 is energized to apply an ignition spark to the cylinder. In other words, the fuel injection function must precede the fuel ignition function. Consequently, the fuel injection order as determined by the fuel injection system must be synchronized with the fuel ignition order as determined by the fuel ignition system. In the illustrated engine 10, the fuel ignition order or firing order of the cylinders 12 is defined by the distributor 80 as one-five-three-six-two-four. Thus, the fuel ignitors 20 are energized sequentially. However, it is not necessary that the fuel injectors 46 be energized sequentially. It has been found that satisfactory operation of the engine 10 can be achieved by alternately simultaneously energizing two separate banks of the fuel injectors 46. Accordingly, based on the ignition order, the cylinders 12 may be divided into first and second banks of sequentially ignited or fired cylinders. For the sake of simplicity, it is assumed that in the illustrated engine 10, the first bank includes cylinders one-five-three and the second bank includes cylinders six-two-four. However, it is to be understood that the first and second banks may be composed of any desired combination of sequentially fired cylinders. Thus, the first bank might include cylinders two-four-one-five and the second bank might include cylinders three-six.

Based on the firing order, an engine operating cycle may be defined to extend from before the firing of the first fired cylinder in the first bank until after the firing of the last fired cylinder in the second bank. Hence, in the illustrated engine 10, an engine operating cycle extends from before the firing of cylinder one until after the firing of cylinder four. Consequently, depending upon which of the cylinders 12 are selected to compose the first and second banks, the engine operating cycle may be separated into first and second operating stages. The first operating stage may be defined to extend from between the firing of the last fired cylinder in the second bank and the firing of the first fired cylinder in the first bank to between the firing of the last fired cylinder in the first bank and the firing of the first fired cylinder in the second bank. The second operating stage may be defined to extend from between the firing of the last fired cylinder in the first bank and the firing of the first fired cylinder in the second bank to between the firing of the last fired cylinder in the second bank and the firing of the first fired cylinder in the first bank. Thus, in the illustrated engine 10, the first operating stage extends from between the firing of the cylinder four and the firing of the cylinder one to between the firing of the cylinder three and the firing of the cylinder six, and the second operating stage extends from between the firing of the cylinder three and the firing of the cylinder six to between the firing of the cylinder four and the firing of the cylinder one.

In addition, corresponding to the chosen division of the cylinders 12 into the first and second banks, the fuel injectors 20 and the fuel ignitors 46 may also be divided into first and second groups. For the illustrated engine 10, the ones of the fuel ignitors 20 associated with the cylinders one-five-three in the first bank form a first group of the fuel ignitors 20 and the ones of the fuel ignitors 20 associated with the cylinders six-two-four form a second group of the fuel ignitors 20. Similarly, the ones of the fuel injectors 46 associated with the cylinders one-five-three in the first bank form a first group of the fuel injectors 46 and the ones of the fuel injectors 46 associated with the cylinders six-two-four in the second bank form a second group of the fuel injectors 46.

Synchronization of the fuel injection order with the fuel ignition order may now be accomplished on a non-interfering time division basis in accordance with the occurrence of the first and second operating stages of each engine operating cycle. During the first operating stage, the first group of the fuel ignitors 20 is energized to ignite fuel within the first bank of the cylinders 12 and the second group of the fuel injectors 46 is energized to apply fuel to the second bank of the cylinders 12. Conversely, during the second operating stage, the second group of the fuel ignitors 20 is energized to ignite fuel within the second bank of the cylinders 12 and the first group of the fuel injectors 46 is energized to apply fuel to the first bank of the cylinders 12. These relationships are graphically illustrated in the table shown in FIG. 2, which is self-explanatory.

Referring again to FIG. 1, an electronic fuel injection control system incorporates a timing apparatus for synchronizing the fuel injection order with the fuel ignition order in the manner previously set forth. The timing apparatus includes a timing transducer 98 and a timing circuit 100. The timing transducer 98 includes a winding 102 mounted on a stator 104 and a pair of permanent magnets 106 and 108 mounted on a rotor 110. The permanent magnets 106 and 108 are oppositely poled with respect to the winding 102. Preferably, the rotor 110 is rotatably driven relative to the stator 104 by the distributor shaft 96 in synchronization with the occurrence of the first and second operating stages of the engine operating cycle. As the rotor 110 is driven relative to the stator 104, the permanent magnets 106 and 108 are alternately carried into and out of electromagnetic coupling relationship with the winding 102 so as to alternately induce first and second timing pulse pairs 112 and 114 in the winding 102, as shown in FIG. 3a, during each revolution of the permanent magnets 106 and 108.

The first timing pulse pair 112 includes a first timing pulse 116 having a first or negative polarity and the second timing pulse pair 114 includes a second timing pulse 118 having a second or positive polarity. In addition, the first timing pulse pair 112 includes a positive polarity pulse 120. Hence, the first timing pulse pair 112 exhibits a positive-to-negative polarity transition occurring at the onset of the first operating stage of each engine operating cycle. Similarly, the second timing pulse pair 114 includes a negative polarity timing pulse 122. Thus, the second timing pulse pair 114 exhibits a negative-to-positive polarity transition occurring in response to the onset of the second operating stage of each engine operating cycle. The significance of these characteristics of the first and second timing pulse pairs 112 and 114 will become more apparent later. However, it is to be understod that the designation of the timing pulse pair 112 as the first timing pulse pair and the designation of the timing pulse pair 114 as the second timing pulse pair is purely arbitrary.

Consequently, the respective designations of the first and second timing pulse pairs 112 and 114 may be reversed without affecting the invention in any way.

Figure 4:
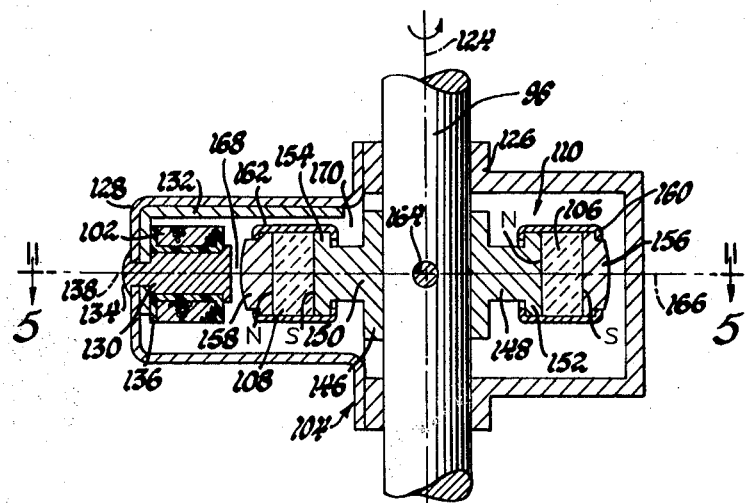
FIGS. 4 and 5 are front and top cross-sectional views, respectively, of a preferred embodiment of the timing transducer incorporated within the invention.
Figure 5:
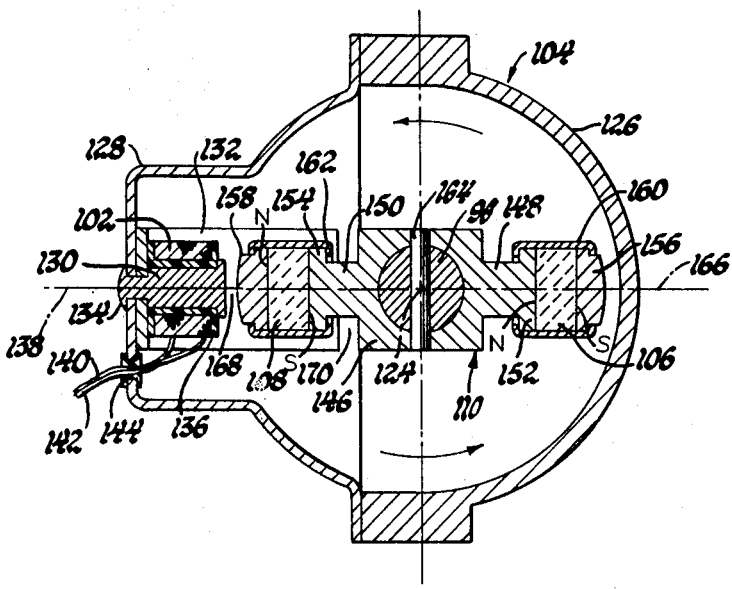

The precise operation of the timing transducer 98 may be best understood by reference to FIGS. 4 and 5 which illustrate the mechanical details of a preferred embodiment. Referring to FIGS. 4 and 5, the distributor shaft 96 having a center line 124 is enclosed by the stator 104 of the timing transducer 98. The stator 104 includes a cast aluminum housing 126 which is preferably supported by the distributor 80. Further, the stator 104 includes a formed brass cover 128 which is suitably attached to the housing 126 by mounting screws (not shown). An electromagnetic flux conducting assembly is provided by a steel flux core 130 and a steel flux return strap 132. The core 130 and the strap 132 are mounted to the cover 128 by a retaining head 134 upset at one end of the core 130. The winding 102 is wound upon an insulating plastic bobbin 136 which is mounted over the core 130. The winding 102 and the core 130 are oriented so as to extend radially inward along a center line 138 perpendicular to the center line 124 of the distributor shaft 96. The winding 102 includes a pair of leads 140 and 142 which extend outside the cover 128 through a grommet 144.

The steel rotor 110 includes a central hub 146 from which a pair of support arms 148 and 150 symmetrically extend to carry a different associated one of a pair of annular mounting pads 152 and 154. The pair of annular permanent magnets 106 and 108 are each held between a different associated one of the annular mounting pads 152 and 154 and a different associated one of a pair of annular steel pole tips 156 and 158 by a different associated one of a pair of annular brass retaining sleeves 160 and 162. The rotor 110 is mounted on the distributor shaft 96 by a roll pin 164 inserted through the central hub 146 and the distributor shaft 96. The rotor 110 is oriented so that the permanent magnets 106 and 108 extend radially outward along a center line 166 perpendicular to the center line 124 of the distributor shaft 96. The permanent magnets 106 and 108 are oriented in opposite electromagnetic flux generating relationship with respect to the winding 102; that is, the permanent magnets 106 and 108 present opposite outwardly projecting magnetic poles. Thus, the permanent magnet 106 has its north pole disposed adjacent the mounting pad 152 and its south pole disposed adjacent the pole tip 156. Conversely, the permanent magnet 108 has its south pole disposed adjacent the mounting pad 154 and its north pole disposed adjacent the pole tip 158.

In the manner previously described, the distributor shaft 96 drives the rotor 110 relative to the stator 104, as indicated by the arrows, so that the permanent magnets 106 and 108 are alternately carried past the winding 102 to induce the first and second timing pulse pairs 112 and 114 in the winding 102 during each revolution of the permanent magnets 106 and 108. More specifically, when the permanent magnets 106 and 108 pass the winding 102, electromagnetic flux generated by the permanent magnets 106 and 108 links the winding 102 along a flux conducting path defined through the associated one of the pole tips 156 and 158, across an air gap 168, through the core 130, through the strap 132, across an air gap 170, and through the associated ones of the support arms 148 and 150 and the mounting pads 152 and 154.

As the permanent magnets 106 and 108 alternately move toward the winding 102, electromagnetic flux increases within the flux path. The electromagnetic flux reaches a maximum when the center line 166 of the permanent magnets 106 and 108 coincides with the center line 138 of the winding 102. As the permanent magnets 106 and 108 alternately move away from the winding 102, the electromagnetic flux decreases within the flux path. Due to the reverse polarity of the permanent magnets 106 and 108 with respect to the winding 102, the direction of the electromagnetic flux generated within the flux path by the respective permanent magnets 106 and 108 is reversed.

Referring to FIG. 3a, the magnitude of the voltage induced within the winding 102 to form the first and second timing pulse pairs 112 and 114 is proportional to the rate of change of the electromagnetic flux generated within the flux path through the core 130. Accordingly, the timing transducer 98 is speed sensitive. Further, since the magnitude of the voltage induced within the winding 102 is equal to the first derivative with respect to time of the magnetic flux generated within the flux path, the timing transducer 98 is also position sensitive. The magnitude of the first and second timing pulse pairs 112 and 114 is nominally centered about a reference level 172 which is equal to zero.

As the permanent magnet 106 moves toward the winding 102, the electromagnetic flux linking the winding 102 through the flux path increases in a clockwise direction. The flux increase is initially gradual and subsequently more rapid. Consequently, the magnitude of the positive polarity timing pulse 120 in the first timing pulse pair 112 initially rises gradually in a positive direction to a maximum level 174 and subsequently falls sharply to the reference level 172. When the center line 166 of the permanent magnet 106 coincides with the center line 138 of the winding 102, the electromagnetic flux is at a maximum but the rate of change of flux is zero. Therefore, the first timing pulse pair 112 experiences a positive-to-negative polarity transition occurring at this point. As the permanent magnet 106 moves away from the winding 102, the electromagnetic flux linking the winding 102 through the flux path decreases in the clockwise direction. The flux decrease is initially rapid and subsequently more gradual. Accordingly, the negative polarity pulse 116 in the first timing pulse pair 112 initially falls sharply to a minimum level 176 and subsequently rises gradually toward the reference level 172. Due to the residual magnetism of the flux path, the negative polarity pulse 116 never quite reaches the reference level 172. As the permanent magnet 108 passes the winding 102, the operation is identical except that the polarities of the pulses 118 and 122 in the second timing pulse pair 114 are opposite to the polarities of the pulses 116 and 120 in the first timing pulse pair 112. This is due to the fact that the electromagnetic flux produced by the permanent magnet 108 within the core 130 is in a counterclockwise direction rather than a clockwise direction.

It will be noted that the illustrated timing transducer 98 contains no contacting parts subject to frictional wear or environmental clogging. Consequently, the timing transducer 98 is characterized by high reliability. Further, rather than the magnitude of the first and second timing pulse pairs 112 and 114, it is the polarity transitions in the pulse pairs 112 and 114 which is of primary interest. Hence, the timing transducer 98 has no critical dimensions to hamper either manufacture or performance. Minor misalignments or loose fittings between the functional parts affect only the magnitude of the first and second timing pulse pairs 112 and 114, not the polarity transitions in the pulse pairs 112 and 114. For the same reason, the timing transducer 98 is unaffected by variations in the ambient temperature. Accordingly, the timing transducer 98 is also characterized by high durability. Once the distributor shaft 96 is initially synchronized with the crankshaft 16 of the engine 10, no adjustments or other maintenance of the timing transducer 98 need be made for the life of the installation.

The timing circuit 100 includes a voltage regulator 178, a bistable multivibrator or flip-flop 180, a clipper 182, a filter 184 and an input level adjustment element 186. The voltage regulator 178 includes a resistor 188 and a plurality of diodes 190, 192, 194 and 196 connected in series between the power line 68 and the ground line 70. A low voltage supply line 198 is connected to the junction between the resistor 188 and the diode 190. The supply voltage applied to the supply line 198 is determined by the voltage divider action provided by the resistor 188 in conjunction with the diodes 190, 192, 194 and 196.

The bistable multivibrator 180 includes first and second switching transistors 200 and 202 of the NPN junction type. The base electrode of the transistor 200 is connected through a biasing resistor 204 to the supply line 198 and through a biasing resistor 206 and a diode 208 to the ground line 70. The diode 208 provides temperature compensation for the transistors 200 and 202. The emitter electrode of the transistor 200 is connected with the emitter electrode of the transistor 202 through a biasing resistor 210. Further, the emitter electrode of the transistor 202 is connected through a biasing resistor 212 to the ground line 70. The collector eelctrode of the transistor 200 and the base electrode of the transistor 202 are both connected through a biasing resistor 214 to the supply line 198. The collector electrode of the transistor 202 is connected through a biasing resistor 216 to the supply line 198.

The clipper 182 includes a pair of diodes 218 and 220 connected in back-to-back relationship between the emitter electrode of the transistor 200 and the ground line 70. The filter 184 comprises a resistor 222 and a capacitor 224. The resistor 222 is connected between the emitter electrode of the transistor 200 and the lead 140 of the winding 102. The capacitor 224 is connected between the emitter electrode of the transistor 200 and the ground line 70. The input voltage level adjustment element 186 is provided by a variable resistor connected between the emitter electrode of the transistor 200 and the supply line 198.

Referring to FIGS. 1 and 3b, the first and second timing pulse pairs 112 and 114 are applied across the winding 102 of the timing transducer 98 as previously described. The filter 184 attenuates any spurious noise signals induced within the winding 102 to prevent false switching of the bistable multivibrator 180. The bistable multivibrator 180 exhibits an upper toggle level 226 and a lower toggle level 228 as will be more fully explained later. The variable resistor 186 is adjusted to apply a bias voltage level 230 to the emitter electrode of the transistor 200 to shift the reference voltage level 172 of the first and second timing pulse pairs 112 and 114 to the bias voltage level 230 which is nominally midway between the upper and lower toggle levels 226 and 228. The clipper 182 limits the magnitude of the first and second timing pulse pairs 112 and 114 at an upper limiting level 232 and at a lower limiting level 234. The upper limiting level 232 is above the upper toggle level 226 and the lower limiting level 234 is below the lower toggle level 228. The upper limiting level 232 is defined by the forward voltage drop of the diode 218 while the lower limiting level 234 is defined by the forward voltage drop of the diode 220.

The bistable multivibrator 180 switches between first and second stable states in response to the first and second timing pulse pairs 112 and 114. In the first stable state, the transistor 200 is fully conductive in a saturated condition and the transistor 202 is fully nonconductive in a cutoff condition. With the transistor 200 turned on and the transistor 202 turned off, the resistors 204, 206, 210, 212 and 214 and the diode 208 establish the upper toggle level 226 above which the voltage of the emitter electrode of the transistor 200 must rise in order to drive the multivibrator 180 into the second stable state. In the second stable state, the transistor 202 is fully conductive in a saturated condition and the transistor 200 is fully nonconductive in a cutoff condition. With the transistor 202 turned on and the transistor 200 turned off, the resistors 204, 206, 210, 212 and 216 and the diode 208 establish the lower toggle level 228 below which the voltage applied to the emitter electrode of the transistor 200 must fall in order to drive the monostable multivibrator 180 into the first stable state. The clipper 182 applies the filtered, shifted and limited first and second timing pulse pairs 112 and 114 to the emitter electrode of the transistor 200.

Assuming the bistable multivibrator 180 is in the second stable state, when the magnitude of the negative polarity pulse 116 in the first timing pulse pair 112 falls below the lower toggle level 228, the bias voltage applied to the transistor 200 by the resistors 204, 206, 210, 212 and 216 and the diode 208 renders the transistor 200 fully conductive. With the transistor 200 turned on, the bias voltage applied to the transistor 202 by the resistors 210, 212 and 214 renders the transistor 202 fully nonconductive. Since the transistor 200 is turned on and the transistor 202 is turned off, the multivibrator 180 is in the first stable state. Consequently, when the positive polarity timing pulse 118 in the second timing pulse pair 114 rises above the upper toggle level 226, the bias voltage applied to the transistor 200 by the resistors 204, 206, 210, 212 and 214 and the diode 208 renders the transistor 200 fully nonconductive. With the transistor 200 turned off, the bias voltage applied to the transistor 202 by the resistors 212 and 214 renders the transistor 202 fully conductive. Since the transistor 202 is turned on and the transistor 200 is turned off, the bistable multivibrator 180 is in the second stable state.

Referring to FIGS. 1 and 3c, the bistable multivibrator 180 produces a bilevel timing signal 236 having an upper level 238 and a lower level 240. The timing signal 236 appears at the collector electrode of the transistor 202 from which it is applied to a trigger circuit 242. When the multivibrator 180 is in the first stable state with the transistor 202 in the fully nonconductive condition, the timing signal 236 is at the upper level 238 as defined by the voltage divider action of the resistor 216 and the input impedance of the trigger circuit 242. When the multivibrator 180 is in the second stable state with the transistor 202 in the fully conductive condition, the timing signal 236 is at the lower level 240 as defined by the voltage divider action of resistors 216 and 212. Thus, the timing signal 236 undergoes an upper-to-lower level transition substantially in response to the occurrence of a positive-to-negative polarity transition in the first timing pulse pair 112. Similarly, the timing signal 236 undergoes a lower-to-upper level transition substantially in response to the occurrence of a negative-to-positive polarity transition in the second timing pulse pair 114.

The trigger circuit 242 includes an input transistor 244, and first and second trigger transistors 246 and 248, all of the NPN junction type. The base electrode of the transistor 244 is connected with the collector electrode of the transistor 202 in the bistable multivibrator 180 of the timing circuit 100. The emitter electrode of the transistor 244 is connected through a feed resistor 250 to the base electrode of the transistor 246. The collector electrode of the transistor 244 is connected directly to the power line 68. The emitter electrodes of the transistors 246 and 248 are connected through a biasing resistor 252 to the ground line 70. The collector electrode of the first trigger transistor 246 is connected through an output resistor 254 to the power line 68. The base electrode of the second trigger transistor 248 is connected through a biasing resistor 256 to the collector electrode of the transistor 246 and through a biasing resistor 258 to the ground line 70. The collector electrode of the transistor 248 is connected through an output resistor 260 to the power line 68.

The input transistor 244 is connected in an emitter follower configuration to present a high input impedance to the bistable multivibrator 180 as previously described. In addition, the transistor 244 amplifies the timing signal 236 and applies it through the resistor 250 to the base electrode of the transistor 246. The first and second trigger transistors 246 and 248 form a conventional Schmitt trigger circuit for providing a first trigger pulse at the collector of the transistor 246 and for providing a second trigger pulse at the collector of the transistor 248. When the timing signal 236 shifts to the upper level 238, the bias voltage applied to the transistor 246 by the resistors 250 and 252 and the transistor 244 renders the transistor 246 fully conductive to initiate the first trigger pulse at a level primarily determined by the voltage divider action of resistors 254 and 252. As the transistor 246 turns on, the bias voltage applied to the transistor 248 by resistors 252, 254, 256 and 258 renders the transistor 248 fully nonconductive to terminate the second trigger pulse.

When the timing signal 236 shifts to the lower level 240, the bias voltage applied to the transistor 246 by the resistors 250 and 252 and the transistor 244 renders the transistor 246 fully nonconductive to terminate the first trigger pulse. As the transistor 246 turns off, the bias voltage applied to the transistor 248 by the resistors 252, 254, 256 and 258 renders the transistor 248 fully conductive to initiate the second trigger pulse at a level primarily determined by the voltage divider action of the resistors 260 and 252. Hence, the trigger circuit 242 produces a first trigger pulse having a time period extending from each lower-to-upper level transition to the next upper-to-lower level transition in the timing signal 236. Further, the trigger circuit 242 produces a second trigger pulse extending from each upper-to-lower level transition to the next lower-to-upper level transition in the timing signal 236. The trigger circuit 242 applies the first and second trigger pulses to a control circuit 262 and to a drive circuit 263.

The control circuit 262 includes monostable multivibrator or blocking oscillator 264. The blocking oscillator 264 includes a control transducer 265 having a primary winding 266 and a secondary winding 268 which are variably inductively coupled through a movable magnetizable core 270. The deeper the core 270 is inserted into the primary and secondary windings 266 and 268, the greater the inductive coupling between the primary winding 266 and the secondary winding 268. The movable core 270 is mechanically connected through a suitable linkage 271 with a pressure sensor 273. The pressure sensor 273 communicates with the intake manifold 26 of the engine 10 downstream from the throttle 40 through a duct 276 to monitor the negative pressure or vacuum within the intake manifold 26. The pressure sensor 273 moves the core 270 within the primary and secondary windings 266 and 268 of the control transducer 265 to regulate the inductive coupling between the primary and secondary windings 266 and 268 as an inverse function of the vacuum within the intake manifold 26. Therefore, as the vacuum within the intake manifold 26 decreases in response to the opening of the throttle 40, the core 270 is inserted deeper within the primary and secondary windings 266 and 268 to proportionately increase the inductive coupling between the primary winding 266 and the secondary winding 268.

The blocking oscillator 264 further includes first and second control transistors 272 and 274 of the NPN junction type. The primary winding 266 is connected from the collector electrode of the transistor 274 through a limiting resistor 276 to the power line 68. The secondary winding 268 is connected from an input junction 278 through a steering diode 280 to a junction between a pair of biasing resistors 282 and 284 which are connected in series between the power line 68 and the ground line 70. A biasing resistor 286 is connected between the junction 278 and the power line 68. The base electrode of the transistor 272 is connected through a steering diode 288 to the junction 278. The emitter electrodes of the transistors 272 and 274 are connected directly to the ground line 70. The collector electrode of the transistor 272 is connected through a biasing resistor 290 to the power line 68 and through a biasing resistor 292 to the base electrode of the transistor 274.

The control circuit 262 further includes first and second differentiators 294 and 296. The first differentiator 294 is provided by a pair of resistors 298 and 300 and a capacitor 302. The resistors 298 and 300 are connected in series between the power line 68 and the ground line 70. The capacitor 302 is connected from a junction 304 between the resistors 298 and 300 to the collector electrode of the transistor 246 in the trigger circuit 242 through a line 306. The second differentiator 296 includes a pair of resistors 308 and 310 and a capacitor 312. The resistors 308 and 310 are connected in series between the power line 68 and the ground line 70. The capacitor 312 is connected from a junction 314 between the resistors 308 and 310 to the collector electrode of the transistor 248 in the trigger circuit 242 through a line 316. A steering diode 318 is connected between the junction 278 and the junction 304 in the first differentiator 294. Similarly, a steering diode 320 is connected between the junction 278 and the junction 314 in the second differentiator 296.

Since the control circuit 262 is generally well known in the fuel injection art, and since it is only incidental to the present invention, the operation of the control circuit 262 will not be described in great detail. In operation, the first trigger pulse is applied through the line 306 to the first differentiator 294 and the second trigger pulse is applied through the line 316 to the second differentiator 296. The first differentiator 294 develops a first negative trigger spike at the junction 304 in response to the initiation of the first trigger pulse. Likewise, the second differentiator 296 develops a second negative trigger spike at the junction 314 in response to the initiation of the second trigger pulse. The first negative trigger spike is applied through the diode 318 to the junction 278 and the second negative trigger pulse is applied through the diode 320 to the junction 278.

The monostable multivibrator or blocking oscillator 264 switches from a stable state to an unstable state in response to an increase in a control voltage at the junction 278 in excess of a predetermined trigger level. Specifically, when the control voltage is above the trigger level, the first control transistor 272 is rendered fully conductive through the coupling action of the diode 288 and the second control transistor 274 is rendered fully nonconductive through the biasing action of the resistor 292. The resistor 286 continually applies a bias voltage to the junction 278 thereby to normally maintain the control voltage at the junction 278 above the trigger level so that the transistor 272 is normally turned on and the transistor 274 is normally turned off. When either of the first and second negative trigger spikes arrives at the junction 278, the control voltage immediately falls below the trigger level. Consequently, the transistor 272 is turned off through the coupling action of the diode 288 and the transistor 274 is turned on through the biasing action of the resistors 290 and 292 to initiate a control pulse at the collector electrode of the transistor 274. The level of the control pulse is defined by the saturation voltage drop of the transistor 274.

With the transistor 274 turned on, a current is established in the primary winding 266 of the control transducer 265 to develop a feedback voltage across the secondary winding 268 of the control transducer 265. The feedback voltage is coupled through the diode 280 to keep the control voltage at the junction 278 below the trigger level so that the transistor 272 remains turned off and the transistor 274 remains turned on. The feedback voltage increases from a low level which is below the trigger level to a high level which is above the trigger level. The high level of the feedback voltage is determined by the voltage divider action of the resistors 282 and 284. The low level of the feedback voltage is determined by the inductive coupling between the primary and secondary windings 266 and 268 as defined by the position of the movable core 270. The rate at which the feedback voltage increases from the low level to the high level is fixed by the $L/R$ time constant of the primary winding 266 and the resistor 276. As the feedback voltage increases, the control voltage at the junction 278 gradually rises above the trigger level. Accordingly, the transistor 272 is turned on through the coupling action of the diode 288 and the transistor 274 is turned off through the biasing action of the resistor 292 to terminate the control pulse. Thus, the time duration of the control pulse appearing at the collector electrode of the transistor 274 is regulated by the vacuum sensor 274 and the control transducer 265 as an inverse function of the vacuum within the intake manifold 26 of the engine 10.

The drive circuit 263 includes a pilot drive circuit 317 and a power drive circuit 319. The pilot drive circuit 317 includes a pair of pilot drive transistors 322 and 324 of the NPN junction type. The base electrode of the transistor 322 is connected through a biasing resistor 325 to the collector electrode of the transistor 246 in the trigger circuit 242. In addition, the base electrode of the transistor 322 is connected through a biasing resistor 326 and a line 328 to the collector electrode of the transistor 274 in the control circuit 262. The base electrode of the transistor 324 is connected through a biasing resistor 330 to the collector electrode of the transistor 248 in the trigger circuit 242. Further, the base electrode of the transistor 324 is connected through a biasing resistor 332 and the line 328 to the collector electrode of the transistor 274 in the control circuit 262. The collector electrode of the transistor 322 is connected through an output resistor 334 to the power line 68. Similarly, the collector electrode of the transistor 324 is connected through an output resistor 336 to the power line 68. The emitter electrodes of the transistors 322 and 324 are connected directly to the ground line 70.

The first and second pilot drive transistors 322 and 324 are normally turned on. The first trigger pulse is applied to the transistor 322 through the resistor 325. The second trigger pulse is applied to the transistor 324 through the resistor 330. The control pulse is applied to the transistor 322 through the resistor 326 and to the transistor 324 through the resistor 332. The transistor 322 is rendered fully nonconductive in response to the coincidence of a first trigger pulse and a control pulse. Likewise, the transistor 324 is rendered fully nonconductive in response to the coincidence of a second trigger pulse and a control pulse. A first pilot drive pulse is established at the collector of the transistor 322 across the resistor 334 having a time duration determined by the time period during which the transistor 322 is turned off. Similarly, a second pilot drive pulse is established at the collector electrode of the transistor 324 across the resistor 336 having a time duration determined by the time period during which the transistor 324 is turned off.

The power drive circuit includes first and second power drive transistors 338 and 340 of the NPN junction type, and first and second power switch transistors 342 and 344 of the PNP junction type. The emitter electrodes of the transistors 338 and 340 are connected directly to the ground line 70. The base electrode of the transistor 338 is connected through a line 346 with the collector electrode of the transistor 322 in the pilot drive circuit 317. The base electrode of the transistor 340 is connected through a line 348 to the collector electrode of the transistor 324 in the pilot drive circuit 317. The emitter electrodes of the transistors 342 and 344 are connected through a biasing diode 350 to the power line 68 and through a biasing resistor 352 to the ground line 70. The base electrode of the transistor 342 is connected through a biasing resistor 354 to the power line 68 and through a biasing resistor 356 to the collector electrode of the transistor 338. The base electrode of the transistor 344 is connected through a biasing resistor 358 to the power line 68 and through a biasing resistor 360 to the collector electrode of the transistor 340. The collector electrode of the first power switch transistor 342 is connected through a line 362 with the second group of the fuel injectors 46. Conversely, the collector electrode of the second power switch transistor 344 is connected through a line 364 with the first group of the fuel injectors 46.

The diode 350 and the resistor 352 apply a suitable bias voltage to the emitter electrodes of the first and second power switch transistors 342 and 344. The first pilot drive pulse is applied through the line 346 to turn on the first power drive transistor 338 which renders the transistor 342 fully conductive to energize the second group of the fuel injectors 46 with a first injection pulse having a time duration equal to the time duration of the first pilot drive pulse. The second pilot drive pulse is applied through the line 348 to turn on the second power drive transistor 340 which renders the transistor 344 fully conductive to energize the first group of the fuel injectors 46 with a second injection pulse having a time duration equal to the time duration of the second pilot drive pulse. Hence, the drive circuit 263 energizes the first group of the fuel injections 46 for a time period determined by the coincidence of a second trigger pulse and a control pulse. Further, the drive circuit 263 energizes the second group of the fuel injectors 46 for a time period determined by the coincidence of a first trigger pulse and a control pulse.

Accordingly, the operation of the fuel injectors 46 is time division synchronized with the operation of the fuel ignitors 20. When the timing signal 236 is at the upper level 238, the first group of the fuel ignitors 20 and the second group of the fuel injectors 46 are energized. Alternately, when the timing signal 236 is at the lower level 240, the second group of the fuel ignitors 20 and the first group of the fuel injectors 46 are energized. Thus, the present invention provides a simple but effective technique for synchronizing the fuel injection order with the fuel ignition order in an internal combustion engine. However, it is to be understood that the preferred embodiment of the invention previously described is shown for illustrative purposes only and that various alterations and modifications may be made without departing from the spirit and scope of the invention.

What is claimed is:

1. In an internal combustion engine system including at least first and second combustion chambers and having an operating cycle formed by at least first and second stages, the combination comprising: means including first and second fuel injectors connected with the first and second fuel injectors connected with the first and second cylinders for injecting fuel to the first and second cylinders when energized, respectively; means including first and second fuel ignitors connected with the first and second cylinders for igniting fuel in the first and second cylinders for igniting fuel in the first and second cylinders when energized, respectively; means connected with the engine and with the first and second fuel ignitors for energizing the first fuel ignitor during the first operating stage and for energizing the second fuel ignitor during the second operating stage; timing transducer means including a magnetic flux sensor for developing a first polarity timing pulse in response to the application of magnetic flux having a first sense and for developing a second polarity timing pulse in response to the application of magnetic flux having a second sense, a first magnetic flux emitter for producing magnetic flux having the first sense and a second magnetic flux emitter for producing magnetic flux having the second sense, and means connected with the engine for relatively driving the first and second magnetic flux emitter and the energy sensor into an out of magnetic flux applying relationship in synchronization with the occurrence of the first and second operating stages during each engine cycle to produce a first polarity timing pulse in response to the onset of the first operating stage and a second polarity timing pulse in response to the onset of the second operating stage; timing circuit means connected with the timing transducer means for producing a timing signal which shifts to a first level in response to the initiation of the first polarity timing pulse and which shifts to a second level in response to the initiation of the second polarity timing pulse; and means connected between the timing transducer means and the first and second fuel injectors for energizing the first fuel injector when the timing signal shifts to the second level and for energizing the second fuel injector when the timing signal shifts to the first level, the means further connected to the engine to energize the first and second fuel injectors for a time duration determined as a function of at least one engine operating parameter; whereby the energization of the fuel injectors is time division synchronized with the energization of the fuel ignitors.

2. In an internal combustion engine system including at least first and second combustion chambers having a given firing order per operating cycle, the combination comprising: fuel supply means including a first fuel injector connected with the first combustion chamber for applying fuel to the first combustion chamber when energized and a second fuel injector connected with the second combustion chamber for applying fuel to the second combustion chamber when energized; timing transducer means including a winding, a pair of permanent magnets oppositely poled with respect to the winding, and means connected with the engine for relatively driving the permanent magnets and the winding into and out of electromagnetic coupling relationship in synchronization with the firing order of the first and second combustion chambers to produce first and second timing pulse pairs in the winding, the first timing pulse pair having a first polarity timing pulse occurring in time before the firing of the second combustion chamber and the second timing pulse pair having a second polarity timing pulse occurring in time before the firing of the first combustion chamber; and means connected between the timing transducer means and the first and second fuel injectors for energizing the first fuel injector in response to the second polarity timing pulse and for energizing the second fuel injector in response to the first polarity timing pulse, the means further connected with the engine to energize the first and second fuel injectors for a time duration determined as a function of at least one engine operating parameter; whereby the fuel injection order of the combustion chambers is synchronized with the fuel ignition order of the combustion chambers.

3. In an internal combustion engine system including at least first and second combustion chambers and having an operating cycle formed by at least first and second stages, the combination comprising: fuel supply means including a first fuel injector connected with the first combustion chamber for applying fuel to the first combustion chamber when energized and a second fuel injector connected with the second combustion chamber for applying fuel to the second combustion chamber when energized; timing transducer means including a winding, a pair of permanent magnets oppositely poled with respect to the winding, and means connected with the engine for relatively driving the permanent magnets and the winding into and out of electromagnetic coupling relationship in synchronization with the firing order of the first and second combustion chambers to produce first and second timing pulse pairs in the winding, the first timing pulse pair including a first timing pulse initiated in response to the onset of the first stage of the engine operating cycle and the second timing pulse pair including a second polarity timing pulse initiated in response to the onset of the second stage of the engine operating cycle; timing circuit means connected with the timing transducer means for producing a timing signal which shifts to a first level in response to the initiation of the first polarity timing pulse and which shifts to a second level in response to the initiation of the second polarity timing pulse; and means connected between the timing transducer means and the first and second fuel injectors for energizing the first fuel injector when the timing signal shifts to the second level and for energizing the second fuel injector when the timing signal shifts to the first level, the means further connected to the engine to energize the first and second fuel injectors for a time duration determined as a function of at least one engine operating parameter; whereby the performance of the fuel injection function of the engine is synchronized with the performance of the fuel ignition function of the engine on a noninterfering basis.

4. In an internal combustion engine system including at least first and second combustion chambers having a given firing order per engine operating cycle, the combination comprising: fuel supply means including a first fuel injector connected with the first combustion chamber for applying fuel to the first combustion chamber when energized and a second fuel injector connected with the second combustion chamber for applying fuel to the second combustion chamber when energized; timing transducer means including a stator, a winding mounted on the stator, a rotor, a pair of permanent magnets mounted on the rotor in opposite electromagnetic flux generating relationship with respect to the winding, and means connected between the engine and the rotor for driving the rotor relative to the stator to alternately rotate the permanent magnets into and out of electromagnetic flux coupling relationship with the winding in synchronization with the firing order of the first and second combustion chambers to produce first and second timing pulse pairs in the winding each having a first polarity pulse and a second polarity pulse, the first timing pulse pair exhibiting a second-to-first polarity transition occuring in time before the firing of the second combustion chamber and the second timing pulse pair exhibiting a first-to-second polarity transition occurring in time before the firing of the first combustion chamber; timing circuit means connected with the winding of the timing transducer for producing a timing signal having alternate first and second levels, the timing signal undergoing a second-to-first level transition in response to the second-to-first polarity transition in the first timing pulse pair and undergoing a first-to-second level transition in response to the first-to-second polarity transition in the second timing pulse pair; and means connected between the timing transducer means and the first and second fuel injectors for energizing the first fuel injector in response to a first-to-second level transition in the timing signal and for energizing the second fuel injector in response to a second-to-first level transition in the timing signal, the means also connected with the engine for energizing the first and second fuel injectors for a time period determined as a function of at least one engine operating parameter; whereby the energization of the fuel injectors is synchronized with the firing order of the combustion chambers according to a time division schedule.

5. In an internal combustion engine system including at least first and second cylinders and having an operating cycle formed by at least first and second operating stages, the combination comprising: means including first and second fuel injectors connected with the first and second cylinders for injecting fuel to the first and second cylinders when energized, respectively; means including first and second fuel ignitors connected with the first and second cylinders for igniting fuel in the first and second cylinders when energized, respectively; means connected with the engine and with the first and second fuel ignitors for energizing the first fuel ignitor during the first operating stage and for energizing the second fuel ignitor during the second operating stage; timing transducer means including a stator, a winding mounted on the stator, a rotor, a pair of permanent magnets mounted on the rotor in opposite electromagnetic flux generating relationship with respect to the winding, and means connected with the engine and with the rotor for driving the rotor relative to the stator to alternately rotate the permanent magnets into and out of electromagneic flux coupling relationship with the winding in synchronization with the occurrence of the first and second operating stages to produce first and second timing pulse pairs in the winding, the first timing pulse pair including a first polarity pulse initiated in response to the onset of the first operating stage and the second timing pulse pair including a second polarity pulse initiated in response to the onset of the second operating stage; timing circuit means including a bistable multivibrator connected with the winding of the timing transducer means for switching to a second stable state in response to the initiation of the first polarity pulse in the first timing pulse pair and for switching to a first stable state in response to the initiation of the second polarity pulse in the second timing pulse pair, the bistable multivibrator producing a timing signal which assumes a first level when the multivibrator switches to the second stable state and which assumes a second level when the multivibrator switches to the first stable state; and means connected with the bistable multivibrator of the timing circuit means and with the first and second fuel injectors for energizing the first fuel injector when the timing signal assumes the second level and for energizing the second fuel injector when the timing signal assumes the first level, the means further connected with the engine for energizing the first and second fuel injectors for a time period determined as a function of at least one engine operating parameter; whereby the energization of the fuel injectors is time division synchronized with the energization of the fuel ignitors.

6. In an internal combustion engine system including at least first and second cylinders and having an operating cycle formed by at least first and second stages, the combination comprising: means including first and second fuel injectors connected with the first and second cylinders for injecting fuel to the first and second cylinders when energized, respectively; means including first and second fuel ignitors connected with the first and second cylinders for igniting fuel in the first and second cylinders when energized, respectively; means connected with the engine and with the first and second fuel ignitors for energizing the first fuel ignitor during the first stage of the engine operating cycle and for energizing the second fuel ignitor during the second stage of the engine operating cycle; timing transducer means including a stator, an electromagnetic flux conducting core supported by the stator, a winding mounted on the core, a rotor, a pair of permanent magnets symmetrically carried by the rotor so as to present opposite radially extending magnetic poles, a pair of electromagnetic flux conducting pole tips each mounted over a different one of the radially extending magnetic poles, and means connected with the engine and with the rotor for driving the rotor relative to the stator in synchronization with the occurrence of the first and second stages of the engine operating cycle to alternately rotate the permanent magnets into and out of electromagnetic coupling relationship with the winding via the pole tips and the core to induce first and second timing pulse pairs in the winding each including alternate first and second polarity pulses, the first timing pulse pair having a second-to-first polarity transition occurring in response to the beginning of the first stage of the engine operating cycle and the second timing pulse pair having a first-to-second polarity transition occurring in response to the beginning of the second stage of the engine operating cycle; timing circuit means including first and second timing transistors each switchable between first and second conductive conditions, the first and second transistors interconnected so that when the first transistor is switched to one of the first and second conductive conditions the second transistor is switched to the other of the first and second conductive conditions, the first transistor connected with the winding of the timing transducer means for switching to the first conductive condition in response to the second-to-first polarity transition in the first timing pulse pair and for switching to the second conductive condition in response to a first-to-second polarity transition in the second timing pulse pair, the second transistor producing a timing signal which shifts to a first level when the second transistor switches to the first conductive condition and which shifts to a second level when the second transistor switches to the second conductive condition; and means connected between the second transistor of the timing circuit means and the first and second fuel injectors for energizing the first fuel injector when the timing signal shifts to the second level and for energizing the second fuel injector when the timing signal shifts to the first level, the means further connected with the engine for energizing the first and second fuel injectors for a time duration determined as a function of at least one engine operating parameter; whereby the energization of the fuel injectors is time division synchronized with the energization of the fuel ignitors.

7. In an internal combustion engine system including at least first and second cylinders and having an operating cycle formed by at least first and second operating stages, the combination comprising: means including first and second fuel injectors connected with the first and second cylinders for injecting fuel to the first and second cylinders when energized, respectively; means including first and second fuel ignitors connected with the first and second cylinders for igniting fuel in the first and second cylinders when energized, respectively; means connected with the engine and with the first and second fuel ignitors for energizing the first fuel ignitor during the first operating stage and for energizing the second fuel ignitor during the second operating stage; timing transducer means including a stator, a winding mounted on the stator, a rotor, a pair of permanent magnets mounted on the rotor in opposite electromagnetic flux generating relationship with respect to the winding, and means connected with the engine and with the rotor for driving the rotor relative to the stator to alternately rotate the permanent magnets into and out of electromagnetic flux coupling relationship with the winding in synchronization with the occurrence of the first and second operating stages as determined by the engine speed to produce first and second timing pulse pairs in the winding, the first timing pulse pair including a first polarity timing pulse initiated in response to the onset of the first operating stage and the second timing pulse pair including a second polarity timing pulse initiated in response to the onset of the second operating stage, the first and second polarity timing pulses having respective magnitudes which are a direct function of the rotor speed as determined by the engine speed; timing circuit means including a clipper connected with the winding of the timing transducer means for limiting the magnitude of the first polarity timing pulse at a first limiting level and for limiting the magnitude of the second polarity timing pulse at a second limiting level, the timing circuit means also including a bistable multivibrator connected with the clipper for producing a timing signal, the timing signal shifting to a first level in response to an increase in the magnitude of the first polarity timing pulse in excess of a first toggle level which is less than the first limiting level, the timing signal shifting to a second level in response to an increase in the magnitude of the second polarity timing pulse in excess of a second toggle level which is less than the second limiting level; and means connected between the bistable multivibrator of the timing circuit means and the first and second fuel injectors for energizing the first fuel injector while the timing signal is at the second level and for energizing the second fuel injector while the timing signal is at the first level, the means further connected with the engine for energizing the first and second fuel injectors for a time period determined as a function of at least one engine operating parameter; whereby the energization of the fuel injectors is time division synchronized with the energization of the fuel ignitors so as to correspondingly synchronize the fuel injection order with the fuel ignition order on a noninterfering schedule.

8. In an internal combustiion engine system including a plurality of combustion chambers having a given repetitive firing order per engine operating cycle so as to form first and second banks of sequentially fired combustion chambers, the combination comprising: fuel supply means including first and second groups of fuel injectors connected with the first and second banks of combustion chambers for metering fuel to the first and second banks of combustion chambers when energized, respectively; timing transducer means connected with the engine for producing first and second timing pulse pairs in synchronization with the firing order of the combustion chambers, the first timing pulse pair including first and second polarity pulses providing a second-to-first polarity transition occurring in time after the firing of the last fired combustion chamber in the second bank and before the firing of the first fired combustion chamber in the first bank, and the second timing pulse pair including first and second polarity pulses providing a first-to-second polarity transition occurring in time after the firing of the last fired combustion chamber in the first bank and before the firing of the first fired combustion chamber in the second bank; timing circuit means connected with the timing transducer means for developing a timing signal having alternate first and second levels, the timing signal undergoing a second-to-first level transition in response to the second-to-first polarity transition in the first timing pulse pair and the timing signal undergoing a first-to-second level transition in response to the first-to-second polarity transition in the second timing pulse pair; trigger circuit means connected with the timing circuit means for producing a first trigger pulse having a time duration extending from each second-to-first level transition to the next first-to-second level transition in the timing signal and for producing a second trigger pulse having a time duration extending from each first-to-second level transition to the next second-to-first level transition in the timing signal; control circuit means connected with the trigger means and with the engine for providing a control pulse in response to the initiation of each of the first and second trigger pulses having a time duration regulated as a function of at least one engine operating parameter; and drive circuit means connected with the trigger means, with the control circuit means, and with the first and second groups of fuel injectors for energizing the first group of fuel injectors in response to the coincidence of a second trigger pulse and a control pulse and for energizing the second group of fuel injectors in response to the coincidence of a first trigger pulse and a control pulse; whereby the energization of the fuel injectors is synchronized with the firing order of the combustion chambers on a noninterferring time division basis.

References Cited

UNITED STATES PATENTS 3,430,616   3/1969   Glockler et al. _____ 123—119
3,522,794   8/1970   Reichardt _____ 123—119X LAURENCE M. GOODRIDGE, Primary Examiner U.S. Cl. X.R.

123—119, 139AFW, 139E

PO-1050
(5/69)

UNITED STATES PATENT OFFICE
CERTIFICATE OF CORRECTION

Patent No. 3,606,869     Dated September 21, 1971

Inventor(s) Gerald O. Huntzinger et al

It is certified that error appears in the above-identified patent and that said Letters Patent are hereby corrected as shown below:

Column 1, line 48, "realtes" should be -- relates --.

Column 2, line 57, after "first" insert -- fired --.

Column 6, line 72, "understod" should be -- understood --.

Column 9, line 15, "eelctrode" should be -- electrode --.

Column 14, claim 1, line 40, after "second" delete -- fuel injectors connected with the first and second --; line 45, delete "for igniting fuel in the first and second cylinders".

Column 16, claim 4, line 24, "occuring" should be -- occurring --; line 68, "electromagneic" should be -- electromagnetic --.

Column 18, claim 8, line 72, "combustiion" should be -- combustion --.

Signed and sealed this 4th day of April 1972.

(SEAL)
Attest:

EDWARD M.FLETCHER,JR.
Attesting Officer

ROBERT GOTTSCHALK
Commissioner of Patents